UNITED STATES PATENT OFFICE.

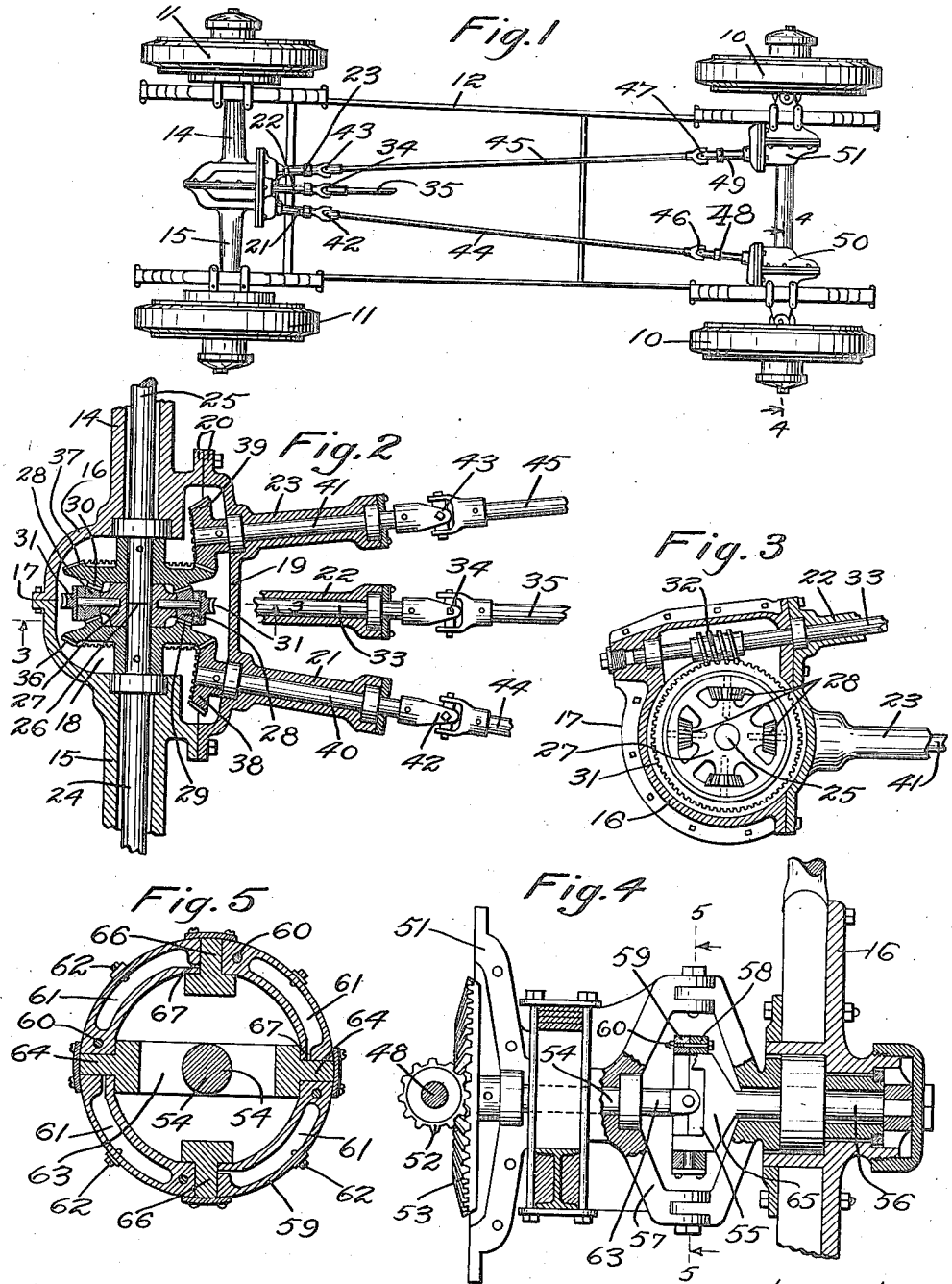

JOSEPH L. WARE, OF ST. PAUL, MINNESOTA, ASSIGNOR TO TWIN CITY FOUR-WHEEL DRIVE COMPANY, OF ST. PAUL, MINNESOTA, A CORPORATION OF SOUTH DAKOTA.

FOUR-WHEEL DRIVING DEVICE.

1,239,990.     Specification of Letters Patent.     Patented Sept. 11, 1917.

Application filed March 6, 1916. Serial No. 82,332.

*To all whom it may concern:*

Be it known that I, JOSEPH L. WARE, a citizen of the United States, residing at St. Paul, in the county of Ramsey and State of Minnesota, have invented certain new and useful Improvements in Four-Wheel Driving Devices, of which the following is a specification.

My invention relates to four wheel driving devices for motor propelled vehicles and has for its object to provide such a device in which a worm gear differential mounted in a casing formed by the rear axle construction shall have associated therewith means, the gearing of which is also in said casing, for driving the front wheels.

It is a further object of my invention to provide improved means of connecting the front or steering wheels with said driving mechanism.

The full objects and advantages of my invention will appear in connection with the detailed description thereof and are particularly pointed out in the claim.

In the drawings illustrating the application of my invention in one form,—

Figure 1 is a plan view of the chassis or frame work of an automobile or truck showing my improvements applied thereto. Fig. 2 is a sectional plan of the differential and driving elements. Fig. 3 is a section on line 3—3 of Fig. 2. Fig. 4 is a section on line 4—4 of Fig. 1. Fig. 5 is a section on line 5—5 of Fig. 4.

As illustrated, the front wheels 10 and rear wheels 11 support a frame work generally designated by numeral 12. The rear portion of this frame work comprises tubular axle sections 14 and 15 formed with a centrally expanded portion 16 united by flanges 17 and providing a differential gear chamber 18. The forward portion of this chamber is closed by a cap 19 bolted through flanges 20 to the sections 14 and 15, said cap having bearing extensions 21, 22 and 23.

Extending within the chamber 18 are floating axle drive shafts 24 and 25 which are in alinement and have their ends abutting, as indicated at 26. Journaled upon the abutting ends of the shafts 24 and 25 is a carrier disk 27 which has thereon bevel pinions 28 meshing with bevel gears 29 and 30 on the respective ends of shafts 24 and 25. The periphery of disk 27 is formed as a worm gear 31 which meshes with a worm 32 on a drive shaft 33 extending through bearing member 22 and connected by universal joint 34 with the engine drive shaft 35. Shafts 25 and 26 are thus differentially driven from the worm gear 31.

Upon the outside of the heads which have the bevel gears 29 and 30 are other bevel gears 36 and 37, meshing respectively with bevel pinions 38 and 39 on shafts 40 and 41 extending through the bearing members 21 and 23. The shafts 40 and 41 are connected respectively through universal joints 42 and 43 with driving shafts 44 and 45, which are connected by universal joints 46 and 47 with other driving shafts 48 and 49, which, as shown in Fig. 4, enter front wheel casings 50 or 51, where a bevel pinion 52 on shaft 48 meshes with a bevel gear 53 on a shaft 54, which, through a special universal joint 55, is connected with the driving spindle 56 of the front wheels 10, which spindles are mounted to oscillate on a vertical axis on yoke member 57. The joint 55 is shown in detail in Figs. 4 and 5. This comprises a circle formed of a pair of complemental members 58, 59 secured together by bolts 60 and having therein a plurality of cavities 61, each adapted to be filled with oil through an opening closed by a screw block 62. On shaft 54 is a forked head 63 which has trunnions 64 journaled in the ring. Similarly on shaft 56 is a forked head 65 which has trunnions 66 journaled in the ring. There are four cavities 61 and from each of the cavities there opens an oil dust 67 upon one of the trunnion journals.

It will be apparent from the above that a powerful universal joint is thus provided in the axis of vertical oscillation of the front steering wheels, the bearings of which are self-lubricating even though exposed to the open air and the incident dust. The entire construction of my invention enables each of the four wheels of a truck or automobile to be positively driven from a single worm gear differential housed, together with the driving means for the front wheels, in the rear axle casing. This greatly reduces the number of parts and makes it practicable to provide a truck having a four wheel drive operated with an engine of the powerful, high speed type.

I claim:

In combination with the four wheels of a truck or automobile, a rear axle comprising two main sections and a face plate section united to form a housing, the face plate section embodying a multiplicity of elongated bearing members and the housing comprising a central chamber, a top chamber and a laterally-positioned chamber, driving shafts for the rear wheels and a worm gear differential mounted thereon in the central chamber, a worm shaft extending through one of said bearing extensions into the top chamber for driving the worm, bevel gears in the side chamber having driving connection with said differential, and drive shafts for the front wheels connected with said bevel gears and journaled in other of said casing extensions.

In testimony whereof I affix my signature in presence of two witnesses.

JOSEPH L. WARE.

Witnesses:
ALEX. LAGAARD,
H. A. BOWMAN.